Sept. 15, 1959 J. D. McMICHAEL 2,904,129
LOW PASS FILTER TYPE CLEANER SILENCER UNIT
Filed Sept. 20, 1956 2 Sheets-Sheet 1

INVENTOR.
John D. McMichael
BY
L. D. Burch
ATTORNEY

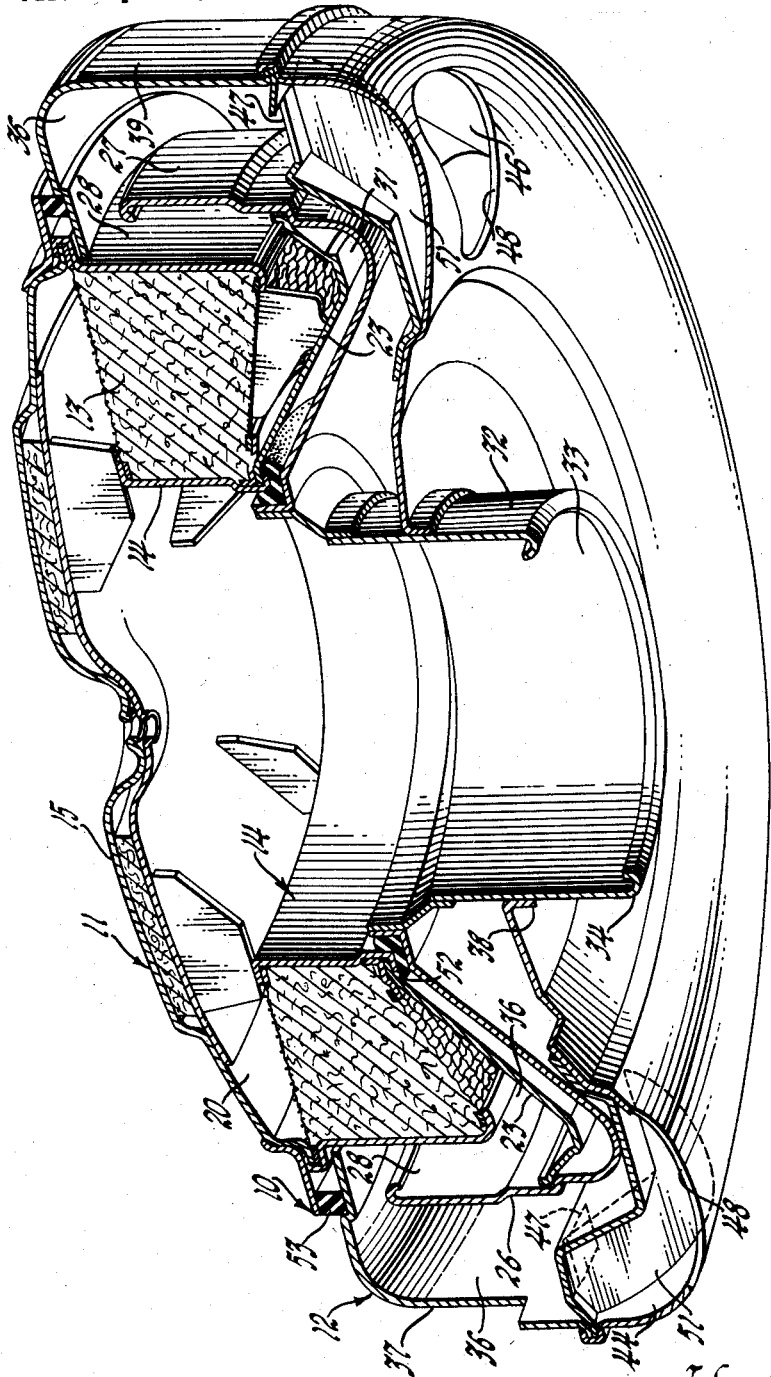

2,904,129

LOW PASS FILTER TYPE CLEANER SILENCER UNIT

John D. McMichael, Swartz Creek, Mich., assignor to General Motors Corporation, Detroit, Mich., a corporation of Delaware Application September 20, 1956, Serial No. 610,981

1 Claim. (Cl. 183—44)

This invention relates to cleaner silencer devices to be used in supplying air to the induction system of an internal combustion engine and has particular relation to cleaner silencer devices for such purposes which are constructed to embody low pass filter type sound attenuating means.

It is proposed to construct a low pass filter type cleaner silencer unit which can be manufactured at low cost, which can be easily serviced and assembled, which will be of minimum height, and which will operate efficiently for the purpose of cleaning air and attenuating sounds incidental to the operation of an internal combustion engine.

In the drawings,

Figure 2 is a perspective view of the cleaner silencer unit shown in cross-section in Figure 1 and illustrating more clearly the inlet passage means embodied in such structure.

Figure 1:
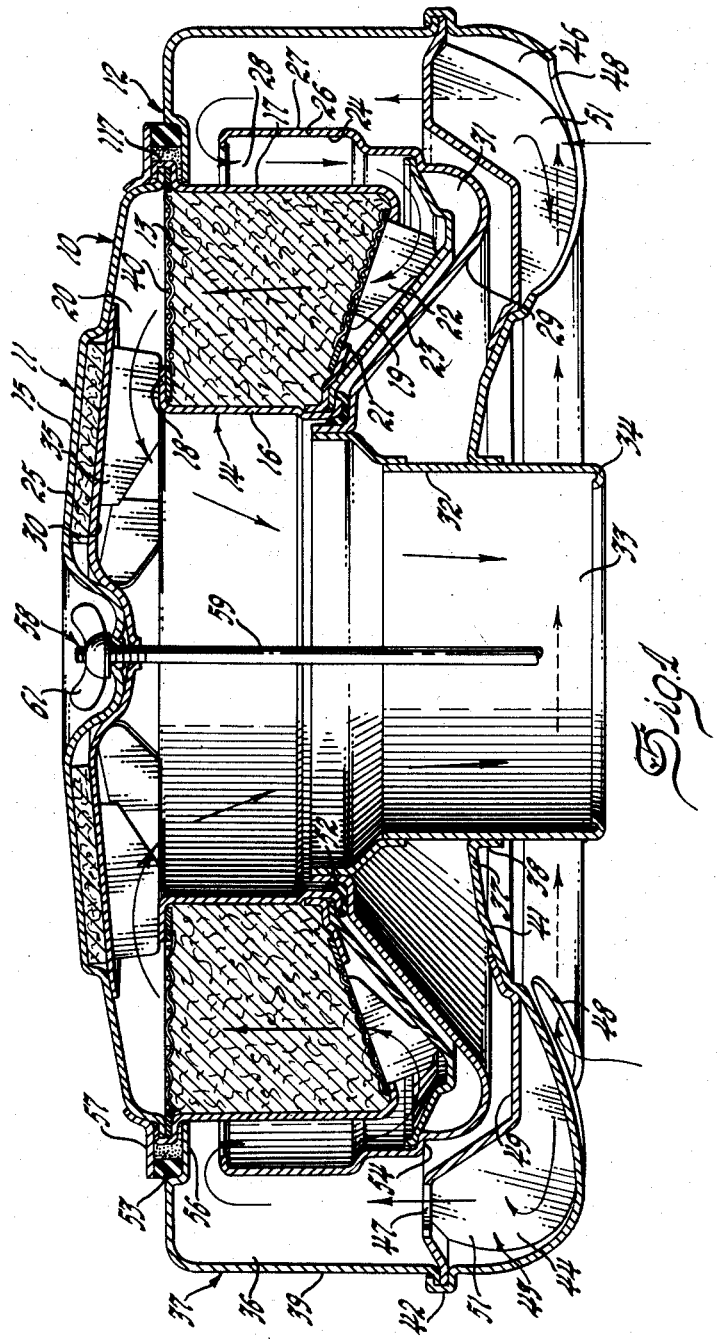
Figure 1 is a vertical sectional view of a cleaner silencer unit or structure embodying the principles of the invention.

The cleaner silencer unit or structure 10 is constructed to embody a filter unit 11 and a silencer unit 12. The filter unit 11 comprises an annular filter element 13 made of any suitable material and adapted to be permanently disposed within a filter casing 14. The filter casing 14 is formed to provide an inner wall 16 and an outer wall 17, the bottom and top of the casing being open through screens 19 and 40 to provide for the circulation of air upwardly through the filter element 13. The filter casing 14 has a cover 15 the edge of which is integrally secured to the casing by a bead 117 formed between the walls at the upper edge of the outer wall 17. The screen 40 also is secured between the bead 117 and the flanged upper edge 18 of the inner wall 16 to prevent dislocation of the filter element 13 within the casing 14. The cover 15 is spaced from the upper end of the filter casing 14 to provide an outlet chamber 20 the central part of which communicates with outlet 33. The central part of the cover 15 also may be depressed outwardly to provide an annular chamber for receiving an annular sound absorbing means 25 made of felt or other suitable material. The sound absorbing means 25 is held in the channel by a plate 30 having supports 35 struck out laterally therefrom to provide radial openings through the plate and through which sound may be absorbed by the means 25. The supports 35 may engage the flanged upper edge 18 of the inner wall 16 to prevent vibration of the cover 15 and to aid in retaining the filter casing 14 in position within the cover 15. The lower wall 21 of the casing 14 is formed to provide openings therein leading to the screen 19 and over which the screen is secured to the wall 21. The openings are formed in such a way as to provide laterally bent supports 22 for the casing 14. The supports 22 engage an oil control baffle 23 which is secured at the inner edge thereof between the flanged lower edge of the inner wall 16 and the adjacent surface of the inner edge of the wall 21, the latter being welded or otherwise secured to the inner wall 16 adjacent the flange. The filter casing 14 is adapted to be disposed in a filter chamber 24 which is formed by a wall 26, the outer part 27 of which is spaced from the outer wall 17 of the casing 14 to provide an annular air inlet 28 which extends to the lower wall of the filter casing through the space between the baffle 23 and the lower wall 21 and between the supports 22. The lower part 29 of the wall 26 extends inwardly beneath the baffle 23 to provide an oil sump 31 in which the baffle 23 is disposed. The inner part 32 of the wall 26 is formed to provide the lower part of outlet 33, the open end of which extends in a direction opposite the open upper end of the filter chamber 24. The lower end of the part 32 of the wall 26 is flanged at the outer extremity of the outlet 33 to provide a bead 34 on which the cleaner silencer unit 10 is adapted to rest on the air inlet for the induction system of the engine with which the structure may be employed. An inlet chamber 36 is formed around the upper part of the wall 26 and communicating with the annular inlet 28. The inlet chamber 36 is formed by a wall 37 the lower part of which may be secured to the wall 26 at any convenient location. In the present instance the lower part of the wall is flanged at 38 and secured to the outlet part 32 of the wall 26 in such a way to extend the inlet chamber 36 beneath the filter chamber 24. The wall 37 may be formed by an upper part 39 and a lower part 41, the parts being joined together at the adjacent edges thereof by a bead 42. The upper edge of the part 39 of the wall 37 may extend inwardly above the outer end of the inlet passage 28 to provide space so that the inlet chamber 36 may communicate with the entrance to the inlet 28. Inlet passage means 43 may be provided to supply air to the inlet chamber 36. The inlet passage means 43 may be formed to provide any number of inlet passages such as those indicated at 44 and 46, each inlet passage being provided with openings 47 and 48 adjacent the opposite ends thereof, the openings 47 being adapted to communicate with the inlet chamber 36, the openings 48 with the atmosphere. If desired, the inlet passage means may be formed by a wall 49 extending around the bottom of the inlet chamber 36 and secured to the wall 37 at the edges thereof extending lengthwise of the passage means 43. The space between the walls 37 and 49 may be divided by transverse partition means 51 to provide any number of intake passages such as those indicated at 44 and 46. The partition means 51 extends across the intake passage means 43 between the opening 48 leading from the atmosphere to one of the intake passages and the opening 47 leading from the other of the intake passages to the chamber 36. The openings 47 preferably are equally spaced around the inlet chamber 36 to provide equal distribution of air throughout the inlet chamber 36.

In order to provide for the economical manufacture and service of the cleaner silencer structure 10, it is proposed to have the cleaner unit 11 readily removable from and replaceable within the silencer unit 12. To accomplish this, it is proposed to provide gasket means 52 and 53 to be compressed between the separable parts of the structure when the structure is assembled. The gasket means 52 may be disposed between the flanged lower edge of the inner wall 16 of the casing 14 and an annular groove formed in the wall 26 between the parts 29 and 32 of the wall 26. It will be apparent that when the filter unit 11 is inserted in the filter chamber 24 the gasket means 52 will support the filter unit 11 and prevent the flow of air between the parts in such region. It is also proposed to construct the baffle 23 in such a way that the outer edge thereof will be resiliently supported by an annular shoulder 54 formed on the wall 26 below the part of the inlet 28 which communicates with the lower part of the filter casing 14. The inwardly extending upper edge of the wall 37 also may be flanged at 56 to provide an annular channel for receiving the gasket means 53. The cover 15 may be provided with an oppositely disposed flange 57, the gasket means 53 being compressed between the two flanges when the filter unit 11 is assembled within the filter chamber 24. Securing means 58 may be provided for compressing the gasket means 52 and 53 and stressing the baffle 23 when the parts of the structure are assembled. The securing means may be in the form of a bolt 59 having the lower end thereof secured to the inlet leading to the induction system of the engine, the upper end projecting through openings formed in the cover 15. A wing nut 61 may be tightened on the threaded end of the bolt 59 for simultaneously securing the parts of the structure together and the structure to the induction system inlet.

It will be apparent that air will enter the openings 48 and flow through the passages 44 and 46 and the openings 47 to the inlet chamber 36. Since the openings 47 are equally distributed around the inlet chamber 36, it will be apparent that the air will be uniformly distributed to the inlet chamber 36. From the inlet chamber 36 the air will flow through the annular inlet 28, the filter element 13, the outlet chamber 20 and the outlet 33 to the induction system of the engine. The sound emanating from the induction system of the engine will be attenuated by the capacitance formed by the outlet 33 and the outlet chamber 20, by the impedance formed by the filter 13 and the annular inlet 28, by the capacitance formed by the inlet chamber 36 and by the impedance formed by the inlet passages 44 and 46.

What is claimed is:

A cleaner silencer unit comprising an annular filter chamber wall providing a centrally disposed outlet and an annular filter chamber around said outlet, annular inlet chamber wall means around and in spaced relation to said filter chamber wall and providing an inlet chamber communicating with said filter chamber around said inlet chamber wall means, annular inlet passage wall means having inner and outer edges secured to said inlet chamber wall means and being spaced between said edges from said inlet chamber wall means to provide inlet passage means, opening means in said inlet passage wall means and in said inlet chamber wall means and providing communication through said inlet passage means between said inlet chamber and the atmosphere, partition means between said inlet passage wall means and said inlet chamber wall means and dividing said inlet passage means into a plurality of arcuate inlet passage means, said opening means in one of said wall means being on opposite sides of said partition means from said opening means in the other of said wall means and providing a plurality of said inlet passage means extending around said unit in the same direction, an annular filter element in said filter chamber and extending across said filter chamber between said inlet chamber and said outlet, and a cover supporting said filter element and extending across and enclosing said filter element and said outlet and engaging said inlet chamber wall means.

References Cited in the file of this patent

UNITED STATES PATENTS

| | | |
|---|---|---|
| 2,507,897 | Gavagnin | May 16, 1950 |
| 2,652,901 | Moler | Sept. 22, 1953 |
| 2,764,142 | McMullen | Sept. 25, 1956 |
| 2,781,861 | Lewis | Feb. 19, 1957 |
| 2,822,885 | Sebok et al. | Feb. 11, 1958 |

FOREIGN PATENTS

| | | |
|---|---|---|
| 869,710 | Germany | Mar. 5, 1953 |
| 756,640 | Great Britain | Sept. 5, 1956 |